United States Patent [19]
Leverenz et al.

[11] 3,827,450
[45] *Aug. 6, 1974

[54] AUTOMATIC CONTROL FOR DEBRINING RELISH STOCK AND OTHER MATERIALS

[75] Inventors: Melvin E. Leverenz; Kenneth H. Leverenz, both of St. Clair, Mich.

[73] Assignee: Diamond Crystal Salt Company, St. Clair, Mich.

[ * ] Notice: The portion of the term of this patent subsequent to Jan. 16, 1990, has been disclaimed.

[22] Filed: Sept. 29, 1972

[21] Appl. No.: 293,417

Related U.S. Application Data

[63] Continuation-in-part of Ser. No. 42,836, June 2, 1970, Pat. No. 3,710,811.

[52] U.S. Cl............................ 137/88, 23/270, 137/5
[51] Int. Cl...................... G05d 11/08, G05d 11/13
[58] Field of Search............. 137/5, 87, 88, 93, 114; 73/53; 210/196, 295; 99/516, 534, 535, 536, DIG. 11; 23/253, 312 AH, 270

[56] References Cited

UNITED STATES PATENTS

| | | | |
|---|---|---|---|
| 1,776,558 | 9/1930 | Herman............................ | 99/516 X |
| 2,858,025 | 10/1958 | Riedel.............................. | 210/295 |
| 2,935,196 | 5/1960 | Miller.............................. | 137/547 X |
| 3,581,752 | 6/1971 | Schoepe et al.................. | 137/549 X |
| 3,710,811 | 1/1973 | Leverenz et al................. | 137/88 X |

Primary Examiner—Robert G. Nilson
Attorney, Agent, or Firm—Harness, Dickey & Pierce

[57] ABSTRACT

An improved system for accurately debrining relish stock, other food stock materials, or like materials requiring automatically controlled debrining.

6 Claims, 5 Drawing Figures

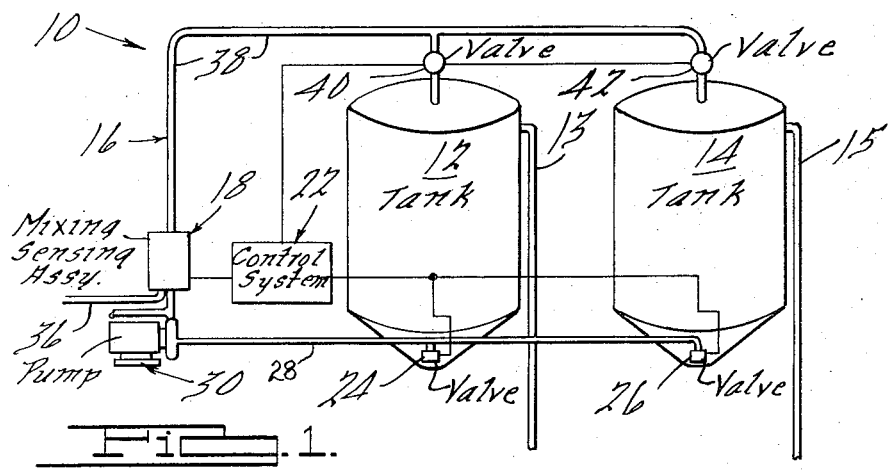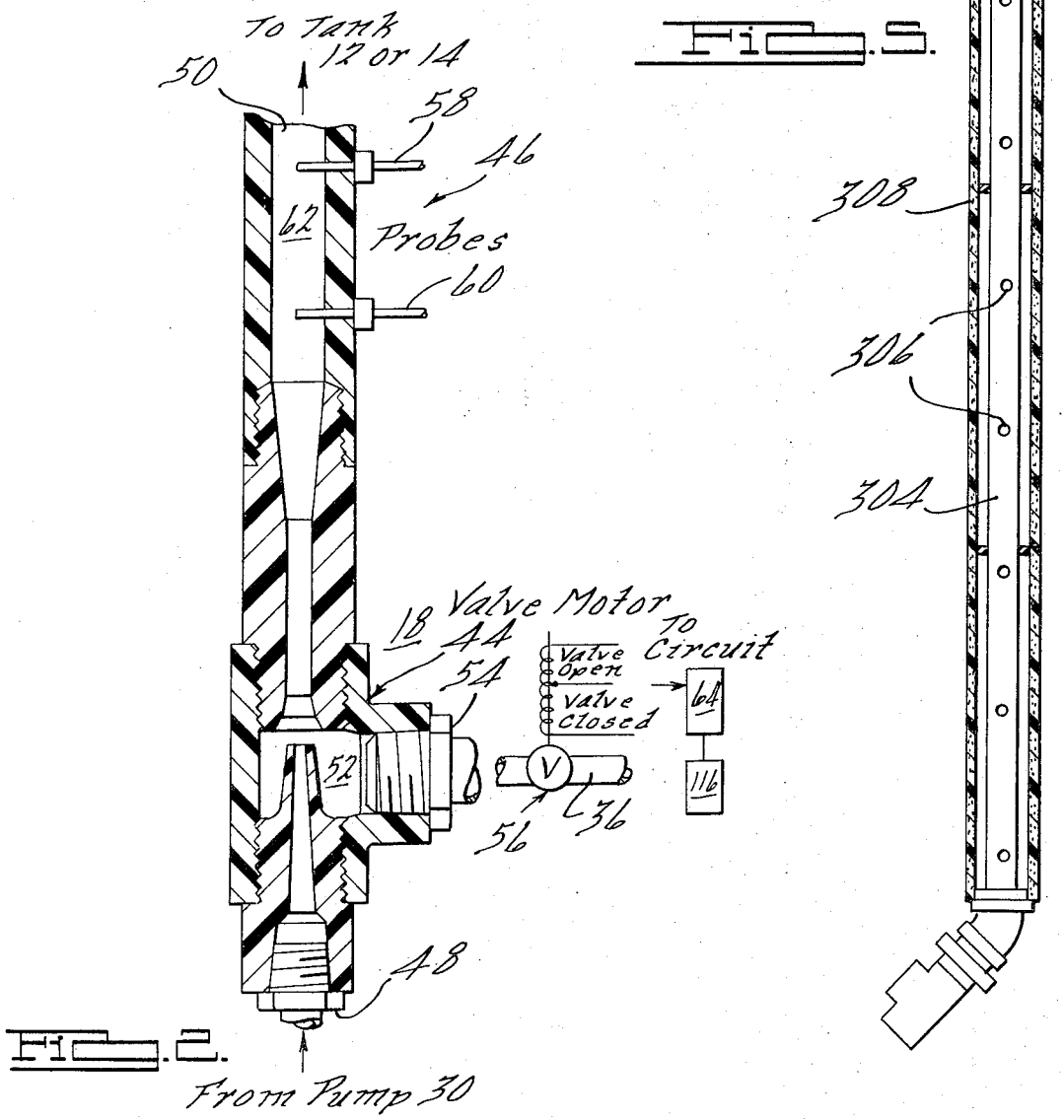

AUTOMATIC CONTROL FOR DEBRINING RELISH STOCK AND OTHER MATERIALS

CROSS REFERENCE TO RELATED APPLICATIONS

This application is a continuation in part of copending U.S. Pat. application Ser. No. 42,836, filed June 2, 1970, now U.S. Pat. No. 3,710,811, and the disclosure of said copending application is hereby incorporated herein by reference.

BACKGROUND OF THE INVENTION

This invention broadly relates to automatic debrining. More particularly the present invention relates to an improved system for accurately debrining relish stock and like materials.

The most widely used procedure for making relish from salt stock pickles is to debrine whole pickles and then chop the pickles into the correct size for relish. This method of debrining salt stock pickles to be used in relish is time consuming and difficult to control.

The above procedure has been improved upon by a few companies who chop the salt stock pickle into relish size prior to debrining. The chopped relish stock is then pumped into a large tank where water is added and the debrining process takes place. Desalting of relish stock in this manner is much less time consuming and easier to control than the desalting of whole pickles. Once the chopped relish stock has been desalted, it is then pumped across a dewatering screen or screw conveyor which reduces the moisture content to that desired in the finished product. Sugar and spices are then added to meet the requirements of the individual relish product. This procedure still lacks control in that the initial pickle stock may vary widely in salt content. Water added in the desalting process must vary in accordance with salt content of the initial stock. Salt content of the initial relish stock normally ranges from 9.0 percent sodium chloride by weight to 18.0 percent sodium chloride. The desired salt content of the finished product is approximately 2.5 percent salt by weight.

Accordingly, one object of the present invention is to provide an improved automatic system for controllably debrining relish stock and like materials.

Another object of the present invention is to provide an improved debrining system.

Other objects, features, and advantages of the present invention will become apparent from the subsequent description and the appended claims taken in conjunction with the accompanying drawings.

BRIEF DESCRIPTION OF THE DRAWINGS

FIG. 1 is an illustration of an exemplary control system according to this invention;

FIG. 2 is an illustration of the mixing valve and sensor arrangement used with the controlled system of FIG. 1;

FIG. 5 is a detail view of a portion of FIG. 4.

SUMMARY OF THE INVENTION

Figure 3:
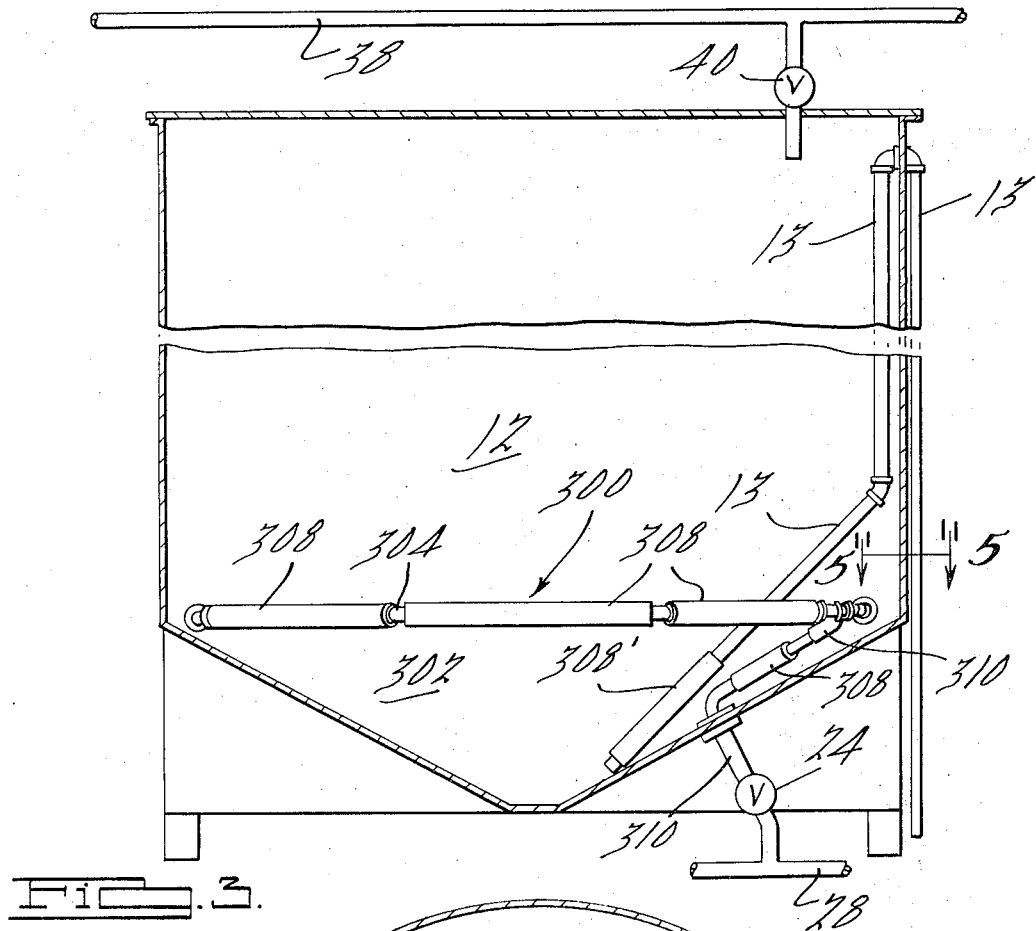
FIG. 3 is an illustration exemplary of a relish container tank utilized in the system of FIG. 1.

The present invention incorporates a unique filter system for separating brine from the relish stock together with a special control system for circulation and control of the brine. A unique filter system composed for example of 250 micron (and preferably between 100 and 800 microns) tubular porous ("Porex" T. M. brand) plastic filters is placed in the bottom of the relish desalting tanks. Brine is drawn through these filters and pumped past a control system where the saturation of brine is automatically checked and uniquely reduced to the desired brine saturation by the addition of fresh water. This controlled brine is then returned back to the top of the relish desalting tank. After desalting is completed, the relish stock and brine may be pumped across a dewatering screen or screw conveyor where the water content is reduced to the desired level of the finished product. Sugar and spices are then added to produce the desired flavor.

The present invention is an improvement over the existing method for desalting relish stock in that it provides an accurate control for the sodium chloride content of the finished product and effects the desalting of the relish product at a much faster rate. Production of relish with a more uniform salt content has the following effects: (1) a more uniform finished product is produced and (2) a reduction in salt content reduces the amount of sugar which must be added to the relish.

This invention also includes a method of backflushing the filter system by the addition of fresh water prior to addition of relish. Fresh water is introduced into the relish desalting tank by opening a valve between the filter system and pump. This effects a backwash of the filter while injecting sufficient fresh water to begin circulation of the tank at the same time as unsalted relish stock is injected into the tank.

Another unique feature of the present invention relates to the overflow system used to remove higher strength brine from the relish desalting tank as additional water is injected. An overflow pipe is placed through the sidewall of the relish desalting tank at the desired control level. The overflow pipe is run down into the bottom of the relish desalting tank where, for example, a 500 micron tubular porous plastic filter is installed. This filter separates relish from the brine. As the liquid level in the tank exceeds the level of the overflow pipe, brine is forced up through the filter and pipe and out of the overflow to the sewer. This removes higher strength brine which has settled to the bottom of the tank.

The present invention effects accurate debrining of relish at the rate of 3,000 gallons of relish per hour. Desalting of relish under one known prior art method requires 24 hours to adequately debrine 8,000 gallons of relish.

DESCRIPTION OF PREFERRED EMBODIMENTS

FIG. 1 is exemplary of an apparatus or system 10 for debrining or reducing the salinity of a brine solution in relish container tanks such as 12 and 14. The system 10 includes a recirculation loop or system 16, a mixing and sensor section 18, a source 36 of liquid fresh water, and a control system 22.

The recirculation system 16 includes a pair of outlet valves 24 and 26 for container tanks 12 and 14 respectively, which preferably are motorized type valves. The outlet valves 24 and 26 when open communicate the respective tanks 12 or 14 with an outlet line 28 which is connected to a centrifugal pump 30. The outlet of the pump 30 is communicated to the mixing and sensor section 18. The mixing and sensor section 18 also receives fresh water from a source such as line 36 and delivers the fluid from the pump 30 and selected portions of the fresh water from the line 36 to a tank return line 38. The tank return line 38 is communicated with the tanks 12 and 14 through valves 40 and 42 respectively, which preferably are also motorized type valves. The valves 24, 26, 40, and 42 are each controlled by the control system 22 for sequentially recirculating the solutions in tanks 12 and 14. For this purpose control lines are provided as illustrated. Spillage of highly concentrated brine solution from the tanks 12 and 14 is made through the overflow pipes designated 13 (also see FIG. 4) and 15 respectively. The function of the overflow pipes will be explained more fully hereinbelow.

According to the invention, the salinity of the brine solution from the tanks 12 and 14 is lowered to a desired level. This is carried out by the introduction of a source of liquid at a lower brine concentration level and preferably by a source of fresh water introduced for example through the conduit 36.

In FIG. 2 the mixing and sensor section 18 is illustrated in detail. The section 18 includes a hydraulic ejector portion 44 and a probe portion 46. Solution from the pump 30 enters in inlet 48 and is discharged through an outlet 50 into the tank return line 38. Flow through the hydraulic ejector 44 reduces the pressure in chamber 52 which draws fluid from the side inlet 54. The side inlet 54 is connected to the outlet line 36 of the fresh water source through a motorized proportioning valve 56. Accordingly the opening of the valve 56 controls the introduction of water into the recirculation loop for delivery through the tank being debrined or processed. The hydraulic ejector 44 accomplishes efficient mixing of the water with the brine solution from the tank such that the probe section 46 receives a well mixed solution. The probe section 46 comprises a pair of conducting probes 58 and 60 used to measure the conductivity of the mixed solution in the passage 62 therebetween. The hydraulic ejector is constructed for example of a plastic material which alleviates the need for insulators for the probes 58 and 60 and resists corrosion by any of the acids from the stock material being processed.

In view of the foregoing description of the mixing and sensing assembly, it can be appreciated that all of the fresh water is introduced to the recirculation loop 16 upstream of the probe section 46 such that the salinity measured by the probe section 46 reflects the water added to the brine solution.

The electrical circuitry 64, 116 shown herein in schematic box form for the control system 22 are illustrated in a detailed fashion in copending U.S. Pat. application Ser. No. 42,836, the disclosure of which is incorporated herein by reference, and said detailed description need not be repeated herein for the sake of brevity.

Figure 4:
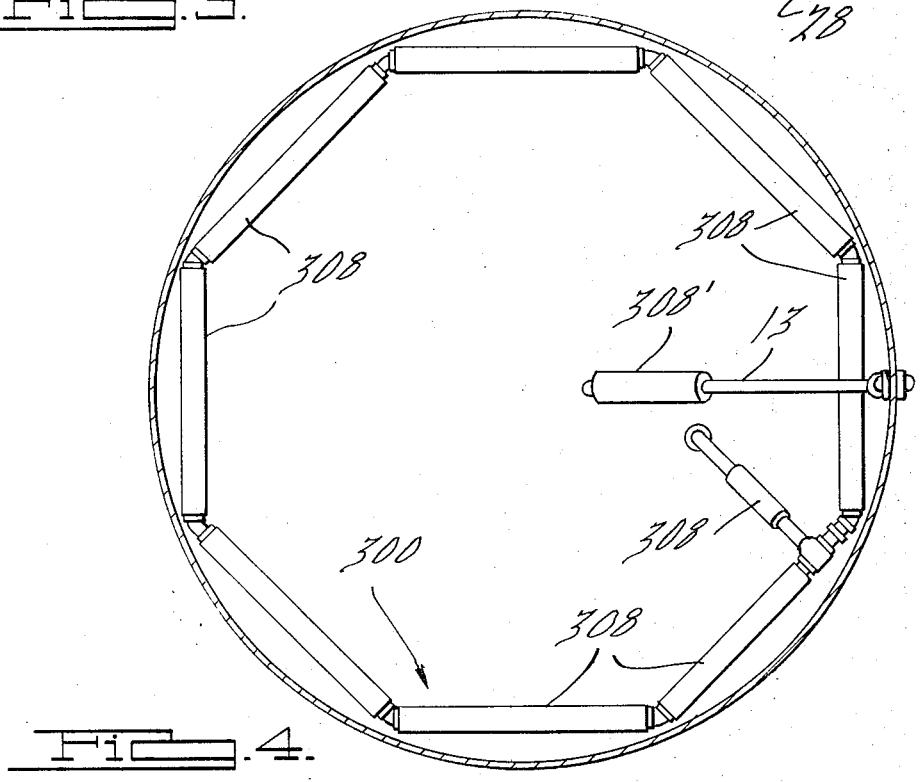
FIG. 4 illustrates a top view of FIG. 3.

Looking now to FIGS. 3-5, there is illustrated a construction of a tank such as the tank 12 including therewithin the unique filtering means designated 300. The tank 12 and the filter means 300 are constructed such that the filter means is generally circular in shape and positioned around the periphery of the upper portion of an inverted cone section 302 of the tank 12. The filter means 300 is constructed of an interior pipe 304 (see FIG. 5) preferably made of a plastic material such as polyvinyl chloride with equidistantly spaced holes 306 positioned in the pipe 304 communicating with the interior of the pipe. The concentrated brine solution in contact with the relish material, such as pickle relish, inside the tank 12 first passes through a porous plastic filtering sleeve material designated 308 which overlies the plastic pipe 304. The porous plastic filtering member 308 contains very finely sized filtering pores distributed throughout the member 308 such that the pickle relish material is separated from the concentrated brine solution which passes through the member 308 and thus through the holes 306 in the pipe 304 to then pass through the conduit 310 and out the line 28 which communicates with the pump 30. The various pipe members 304 are connected by a series of threaded elbows 314, nipples 316, unions 318, and T-members 320 all of which are suitably connected as best seen in FIG. 5.

The tank 12 also includes an overflow pipe for removing spillage of the excess highly concentrated brine from the bottom of the tank. The overflow pipe 13 also includes a porous plastic filtering member designated 308'. The highly concentrated brine material in the tank 12 automatically gravitates towards the bottom of the tank and the excess spillage of this highly concentrated brine to compensate for the additional fresh water fluid which is added to the system flows out through the overflow pipe 13 and is discarded. Thus in this fashion the volume of liquid within the apparatus system remains constant because as additional fresh water is added to the system through the conduit 36 an equal volume of highly concentrated brine is forced out of the system through the overflow pipe 13. Operation is the same for overflow pipe 15 of tank 14.

While it will be apparent that the preferred embodiments of the invention disclosed are well calculated to fulfill the objects above stated it will be appreciated that the invention is susceptible to modification, variation, and change without departing from the proper scope or fair meaning of the subjoined claims.

What is claimed is:

1. An apparatus means for automatically controlling the debrining of relish stock material and like materials, comprising,
   container means for holding the material,
   filter means inside the container means generally proximate to the bottom thereof for filtration separating of brine solution from the material,
   fluid recirculating means for receiving the brine solution from the filter means and returning at least a portion of said brine to said container means,
   said recirculating means including a flow line means having a mixing section and a measuring section with said measuring section being spaced from and disposed downstream from said mixing section,
   a source of liquid water having a salinity less than a desired level for the brine solution from the filter means,
   means associated with said recirculating means including probe means for measuring the salinity of said solution received by said recirculating means by measuring the conductivity of said solution, said probe means being disposed at said measuring section so that the conductivity is measured at a point in said recirculating means after mixing of said liquid with said solution to thereby assure that the salinity of said solution in said container does not pass said desired level, said measuring means providing an error signal having a magnitude indicative of a difference existing between said measured salinity and said desired salinity;

means for introducing said liquid from said source to said solution in response to said error signal indicative of a difference in salinity.

2. The invention of claim 1 wherein,
said filter means is of porous plastic material.

3. The invention of claim 1 wherein,
said apparatus means is operative to accurately debrine at least about 2,000 gallons per hour of said material.

4. An apparatus for automatically controlling the debrining of relish stock material and like materials by adjusting the salinity of a brine solution in a container of the material to a desired level, comprising:

a very finely pored filter means in said container operative to filter the brine solution from the material, recirculating means associated with said container for receiving solution from said container and returning at least a portion of said solution to said container, said recirculating means including a flow line having a mixing section and a measuring section with said measuring section being spaced from and disposed downstream from said mixing section;

a source of liquid having a salinity differing from said desired level in the opposite sense as said solution;

means associated with said recirculating means including probe means for measuring the salinity of said solution received by said recirculating means by measuring the conductivity of said solution, said probe means being disposed at said measuring section so that the conductivity is measured at a point in said recirculating means after mixing of said liquid with said solution to thereby assure that the salinity of said solution in said container does not pass said desired level, said measuring means providing an error signal having a magnitude indicative of a difference existing between said measured salinity and said desired salinity;

means for introducing said liquid from said source to said solution in response to said error signal indicative of a difference in salinity, said introducing means including proportioning valve means interposed between said source and said mixing section of said recirculating means, said valve means being responsive to the magnitude of said error signal for providing an introduction of said liquid from said source to said solution.

5. The apparatus of claim 4 for establishing the salinity of a solution in a plurality of containers at a desired level including:

valve means for said recirculating means adapted to sequentially connect said recirculating means to each of said containers, said measuring means being thereby adapted to measure said salinity and said means for introducing said liquid being thereby adapted to introduce said liquid to each container during each period in which said recirculating means is connected to each of said containers.

6. The invention of claim 4 wherein,
said apparatus means is operative to accurately debrine at least about 2,000 gallons per hour of said material.

* * * * *